United States Patent [19]
LaBerge et al.

[11] Patent Number: 5,515,501
[45] Date of Patent: May 7, 1996

[54] REDUNDANT MAINTENANCE ARCHITECTURE

[75] Inventors: Paul LaBerge, Coon Rapids; Larry L. Byers, Apple Valley; Greg Wiedenman, Woodbury, all of Minn.

[73] Assignee: Unisys Corporation, Blue Bell, Pa.

[21] Appl. No.: 184,691

[22] Filed: Jan. 21, 1994

[51] Int. Cl.$^6$ ............................................. G06F 11/00
[52] U.S. Cl. ...................................................... 395/182.08
[58] Field of Search .................................. 371/5.1, 18, 9.1, 371/62; 395/575, 182.08, 182.11

[56] References Cited

U.S. PATENT DOCUMENTS

| | | | |
|---|---|---|---|
| 3,641,505 | 2/1972 | Artz et al. | 340/172.5 |
| 3,812,469 | 5/1974 | Hauck et al. | 340/172.5 |
| 4,070,704 | 1/1978 | Calle et al. | 364/200 |
| 4,245,306 | 1/1981 | Besemer et al. | 364/200 |
| 4,347,563 | 8/1982 | Paredes et al. | 371/9.1 |
| 4,437,157 | 3/1984 | Witalka et al. | 364/200 |
| 4,455,645 | 6/1984 | Mijioka et al. | 370/16 |
| 4,803,682 | 2/1989 | Hara | 371/12 |
| 4,843,541 | 6/1989 | Bean et al. | 364/200 |
| 4,868,818 | 9/1989 | Madan et al. | 371/11.3 |
| 4,872,106 | 10/1989 | Slater | 364/200 |
| 4,888,771 | 12/1989 | Benignus et al. | 371/16.1 |
| 4,891,810 | 1/1990 | de Corlieu et al. | 371/9.1 |
| 4,970,724 | 11/1990 | Yung | 371/9.1 |
| 4,979,107 | 12/1990 | Advani et al. | 364/200 |
| 4,995,035 | 2/1991 | Cole et al. | 370/95.2 |
| 4,996,688 | 2/1991 | Byers et al. | 371/16.5 |
| 5,014,197 | 5/1991 | Wolf | 364/200 |
| 5,058,056 | 10/1991 | Hammer | 364/900 |
| 5,079,740 | 1/1992 | Patel | 395/182.08 |
| 5,113,522 | 5/1992 | Dinwiddie, Jr. et al. | 395/700 |
| 5,125,081 | 6/1992 | Chiba | 395/325 |
| 5,129,077 | 7/1992 | Hillis | 395/500 |
| 5,165,018 | 11/1992 | Simor | 395/300 |
| 5,170,472 | 12/1992 | Cwiakala et al. | 395/275 |
| 5,185,693 | 2/1993 | Loftis | 364/187 |
| 5,251,299 | 10/1993 | Masuda et al. | 395/200 |
| 5,253,344 | 10/1993 | Bostick et al. | 395/275 |
| 5,267,246 | 11/1993 | Huang et al. | 371/18 |
| 5,398,332 | 3/1995 | Komoda | 395/575 |

*Primary Examiner*—Robert W. Beausoliel, Jr.
*Assistant Examiner*—Glenn Snyder
*Attorney, Agent, or Firm*—Nawrocki, Rooney & Sivertson

[57] ABSTRACT

A redundant maintenance architecture for general purpose, digital computer systems. The architecture has both redundant maintenance controllers and redundant maintenance interfaces. This invention provides uninterrupted maintenance control over a distributed system despite any single hardware failure. This is accomplished by providing a low level hardware fault detection and correction apparatus which does not require expensive test hardware or software. The low level hardware apparatus detects faults within a primary maintenance controller or interface and transfer control of the maintenance functions of the computer system to a secondary maintenance controller and interface. All of this is accomplished on-the-fly and does not require that the computer system be switched into a test mode or otherwise interrupted from normal operation.

7 Claims, 3 Drawing Sheets

REDUNDANT MAINTENANCE ARCHITECTURE

CROSS REFERENCE TO CO-PENDING APPLICATIONS

Commonly assigned U.S. patent application Ser. No. 08/000,290, filed Jan. 4, 1993, and entitled "SITE CONFIGURATION MANAGEMENT SYSTEM" is incorporated herein by reference. Commonly assigned U.S. patent application Ser. No. 08/173,408, filed Dec. 23, 1993, and entitled "MICRO-ENGINE DIALOGUE INTERFACE" is also incorporated herein by reference.

BACKGROUND OF THE INVENTION

1. Field of the Invention

The present invention is generally related to general purpose, stored program, digital computers and more particularly relates to computer architectures having maintenance paths to improve system reliability.

2. Description of the Prior Art

A key element in the design of today's digital data processing equipment is the factor of testability. In the past twenty years, the complexity of integrated circuits and computer systems has increased exponentially with time. As a result, current computer systems often have internal circuitry which cannot be controlled or observed from accessible I/O pins.

One technique for improving the testability of today's computer systems is to provide maintenance circuitry within the computer system which allows the internal circuity to be controlled and observed. An examples of this technique is a Serial SCAN architecture. SCAN providing serial scan registers and serial scan paths within the design. These components allow the internal nodes to become controllable and observable via a plurality of serial scan input ports and a plurality of serial scan output port.

A typical method of testing a system which employs SCAN is to use computer generated serial scan test vectors. The scan registers are first placed in a "test" mode. Then, a serial scan vector is serially clocked into the scan registers via a scan-data-in port. The scan registers are then switched into functional mode. At this point, the data contained in the registers trickle through the logic between registers until they reach the input of a receiving scan register. The test controller then clocks the functional clock once capturing the data that just trickled through said logic. The resulting contents are serially clocked out via a scan-data-out port and compared to an expected result. This process is repeated until a predetermined fault coverage is reached. This process is carried out via high level interfaces connected to external test equipment, controllers or even operating systems. Therefore, costly test hardware and/or software is required to utilize this methodology.

The SCAN methodology can be coupled to a Built-in-Self-Test (BIST) algorithm which allows the computer system to perform self tests. However, BIST algorithms required either a special BIST processor within the design or the use of external test hardware to perform the tests. In addition, BIST requires that the computer system be placed in a "test" mode thereby allowing the registers within the design to be serially scanned.

Finally, the SCAN and/or BIST techniques can be combined with self correcting algorithms. That is, once a fault is detected, algorithms can be used to isolate which devices or interconnect lines within the system are faulty. This allows the system designer to design in redundant components which can replace the detected faulty components. However, systems which employ this methodology require the backup components to be activated through higher level interfaces, controllers or even operating systems. Therefore, costly test hardware and/or software is required to utilize this methodology. In addition, these systems require that the system be taken out of the functional mode and placed into a "test" mode in order to detect any faults and to replace any faulty components. This results in a period of time where the system is functionally inoperable.

Finally, some computer systems employ maintenance architectures which provide maintenance processors and maintenance interfaces. The maintenance processors are responsible for directing all maintenance activity within the computer system. The maintenance interfaces are used to direct the maintenance commands from the maintenance processors to the various computer components. The typical mode for testing the maintenance processor and maintenance interfaces would be through scan vectors as discussed above.

SUMMARY OF THE INVENTION

The present invention overcomes the disadvantages found in the prior art by providing a low level hardware orientated fault detector which operates continuously even when in functional mode. In addition, a plurality of redundant components are provided within the system which can be activated by the low level hardware orientated fault detector. The advantages of the present invention include allowing the detection and replacement of a faulty component or interface without requiring mostly supporting hardware and/or software. Furthermore, because of the redundant components, redundant interface lines and the low level hardware detector, the system can replace a faulty set of components on-the-fly and therefore no system down time is experienced.

The preferred embodiment of the present invention was designed for a computer system comprising a primary maintenance processor (NIM), a secondary maintenance processor, a primary maintenance interface (DBI interface), a secondary maintenance interface, and one maintenance chip (MNT1) per XPC module (two XPC modules per backpanel). The maintenance chips are connected together via the primary and secondary maintenance interfaces in a daisy chain fashion. The maintenance chip (MNT1) resides on the Clk/Maint card within the XPC. The primary maintenance processor (NIM) and the primary maintenance interface (DBI interface) are active as long as no failure in the maintenance path is detected.

If a failure is detected, the primary maintenance processor and the primary interface are deactivated and replaced by the secondary maintenance processor (NIM) and the secondary interface (DBI interface). This is done on-the-fly via a low level hardware detection circuit. Although the maintenance processors (NIMs) can be coupled to external computer hardware through a 802.5 token ring LAN interface, the external hardware is not required for minimum maintenance functions. Only the maintenance processor (NIM) is required for minimum maintenance, which includes system fault detection and recovery. Therefore, the present invention provides a mechanism to switch to a backup maintenance processor without a high level user interface or controller.

The preferred embodiment accomplishes this by providing a low level hardware circuit which is implemented in each maintenance controller. The low level hardware circuit comprises a NIM switch timer circuit which is reset periodically with a low level polling routine. If the primary maintenance controller (NIM) or the primary maintenance path (DBI) fail, the timer will expire and the secondary maintenance controller and secondary maintenance interface will be activated and will replace the primary components. The primary NIM and primary DBI interface are ignored by all system elements thereafter (or until a computer technician can repair the damaged component). The preferred embodiment also checks to ensure that the clock signals within the maintenance controller and maintenance interface are active.

Because the preferred embodiment of the present invention comprises redundant maintenance interface paths and redundant maintenance controllers, this invention provides uninterrupted maintenance control over a distributed system despite any single hardware failure. In addition, this invention provides a method for fixing any broken maintenance path without interrupting maintenance functions in the rest of the system.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENT

Figure 1:
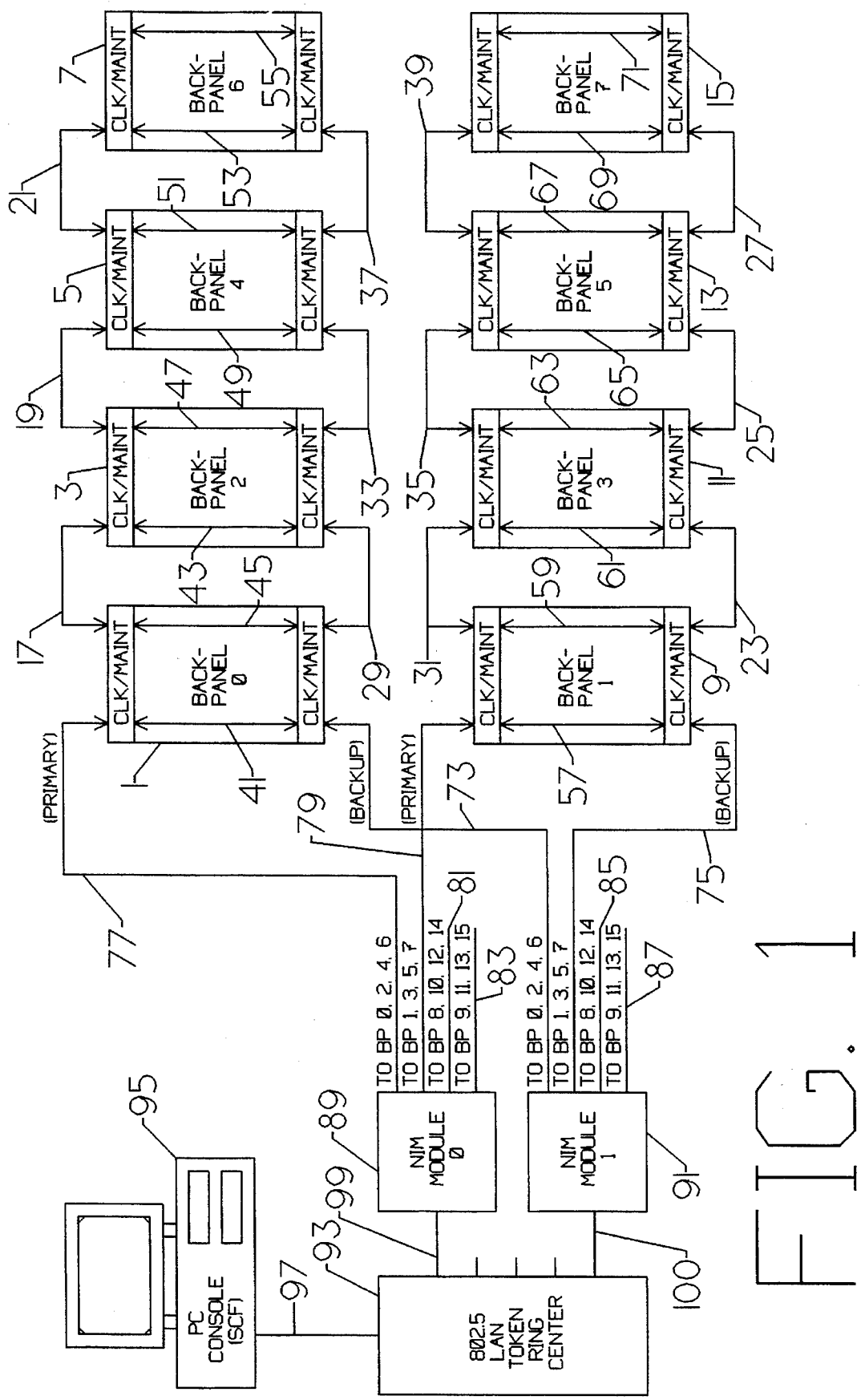
FIG. 1 is a block diagram of the maintenance controller (NIM) interconnections to the XPC modules.

FIG. 1 is a block diagram of the maintenance controller (NIM) interconnections to the XPC modules. The preferred embodiment of the present invention was designed for the Extended Processor Complex (XPC). Further details concerning the XPC are available in the above referenced and commonly assigned U.S. Patent Applications entitled "MICRO-ENGINE DIALOGUE INTERFACE" and "SITE CONFIGURATION MANAGEMENT SYSTEM".

The maintenance system for the XPC consists of primary and secondary maintenance processors (NIMs), primary and secondary maintenance interfaces (DBI interfaces), and one maintenance chip (MNT1) per XPC module (two XPC modules per back panel). NIM module-0 89 is the primary maintenance processor while NIM module-1 91 is the secondary maintenance processor. During normal operation NIM module-0 89 is in control of all maintenance functions. When a fault is detected in NIM module-0 89 or any of the primary maintenance interfaces, control is given to NIM module-1 91.

The XPC system consists of a plurality of back panel subcircuits. FIG. 1 illustrates the maintenance interfaces for backpanel-0 through backpanel-7. Each back panel contains up to two XPC modules. The first XPC module within a backpanel is in a different power domain than is the second XPC module. Each XPC module also has a clock/maintenance card. Each clock/maintenance card contains one maintenance chip (MNT1).

Backpanel-0 1 is coupled to NIM module-0 89 via primary diagnostic bus interface (DBI) 77. Backpanel-0 1 is further coupled to backpanel-2 3 via primary DBI interface 17. Backpanel-2 3 is coupled to backpanel-4 5 via primary DBI interface 19. Backpanel-4 5 is coupled to backpanel-6 7 via primary DBI interface 21. Note that backpanel-0 through backpanel-6 are connected in a daisy chain fashion. Backpanel-1 9 is coupled to NIM module-0 89 via primary DBI interface 79. Backpanel-1 9 is further coupled to backpanel-3 11 via primary DBI interface 31. Backpanel-5 13 is coupled to backpanel-3 11 via primary DBI interface 35. Backpanel-7 15 is coupled to backpanel-5 13 via primary DBI interface 39. Note that backpanel-1 9, backpanel-3 11, backpanel-5 13 and backpanel-7 15 are coupled together in a daisy chain fashion. Backpanel-0 1 is coupled to NIM module-1 91 via back-up DBI interface 73. Backpanel-2 3 is coupled to backpanel-0 1 via back-up DBI interface 29. Backpanel-4 5 is coupled to backpanel-2 3 via back-up DBI interface 33. Backpanel-6 7 is coupled to backpanel-4 5 via back-up DBI interface 37. Note that backpanel-0 1, backpanel-2 3, backpanel-4 5 and backpanel-6 7 are coupled in a daisy chain fashion. Backpanel-1 9 is coupled to NIM module-1 91 via back-up DBI interface 75. Backpanel-3 11 is coupled to backpanel-1 9 via back-up DBI interface 23. Backpanel-5 13 is coupled to backpanel-3 11 via back-up DBI interface 25. Finally, backpanel-7 15 is coupled to backpanel-5 13 via back-up DBI interface 27. Note that backpanel-1 9, backpanel-3 11, backpanel-5 13 and backpanel-7 15 are coupled together in a daisy chain fashion.

Primary DBI interface 81 is coupled to backpanels 8, 10, 12 and 14 in a daisy chain manner (not shown). Likewise, primary DBI interface 83 is coupled to backpanels 9, 11, 13 and 15 in a daisy chain manner (not shown). Back-up DBI interface 85 is coupled to backpanel 8, 10, 12 and 14 in a daisy chain manner (not shown). Finally, back-up DBI interface 87 is coupled to backpanel 9, 11, 13 and 15 in a daisy chain manner (not shown).

Clock/maintenance control signal interfaces 41, 43, 49, 53, 57, 61, 65 and 69 are controlling when NIM module-0 89 is active. Clock/maintenance control interfaces 45, 47, 51, 55, 59, 63, 67 and 71 are controlling when NIM module-1 91 is active.

During normal operation NIM module-0 89 controls backpanel-0 1, backpanel-2 3, backpanel-4 5 and backpanel-6 7 via primary DBI interfaces 77, 17, 19 and 21. In addition NIM module-0 89 further controls backpanel-1 9, backpanel-3 11, backpanel-5 13 and backpanel-7 15 via primary DBI interfaces 79, 31, 35 and 39. If a failure is detected in either NIM module-0 89 or any of the primary DBI interfaces, then a special low level hardware circuit (see FIG. 3) switches control from NIM module-0 89 to NIM module-1 91. All system elements ignore all signals emanating from NIM module-0 89 thereafter.

Note that after control is switched from the primary NIM to the secondary NIM, the defective XPC module may be powered down separately from the rest of the system, because it is no longer part of the daisy chain. That is, it is on a separate finger extending from its partner XPC module in the same back panel. This allows the broken maintenance path to be fixed, while no loss of maintenance is observed in the rest of the system. After the detected fault is fixed (e.g. by a technician), the fixed XPC module can be brought back into the system and the primary NIM can either resume control or wait in a "stand-by" mode until a failure occurs in the "new" primary NIM.

In the preferred mode of the present invention, NIM module-0 89 and NIM module-1 91 can be coupled to a 802.5 LAN token ring via wires 99 and 100, respectively. The LAN token ring 93 can be coupled to a PC console 95 via interface 97. The NIM modules have the capability to accept commands from the PC console. In fact, more robust testing can be accomplished with the PC console because of the additional hardware and software present. It is anticipated that the PC console will be used for performing periodic robust testing of the entire system. The NIM modules would be responsible for monitoring and correcting system failures which occur between these periodic robust tests.

Figure 2:
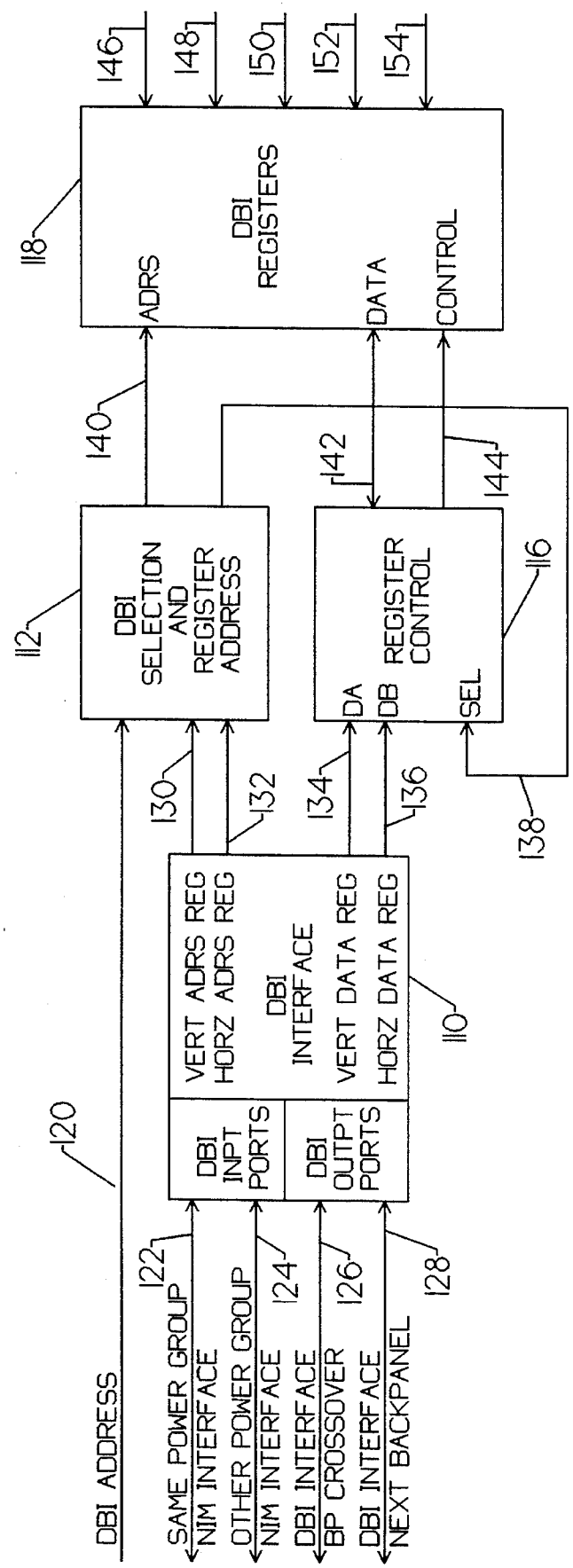
FIG. 2 is a block diagram of the maintenance chip.

FIG. 2 is a block diagram of the maintenance chip (MNT1). There is one maintenance chip per XPC module and therefore two maintenance chips per back panel. The maintenance chip is located on the clock/maintenance card. There are two clock/maintenance cards per back panel (see FIG. 1). The maintenance chips are coupled directly to the DBI interfaces and provide the interface between the NIM modules and the XPC circuitry.

In the event of a DBI interface failure, all of the XPC modules at or below the failure level will be inactive from a maintenance perspective because of the daisy chain configuration. If a failure is detected, the back-up NIM takes control of all MNT1s in the system (the actual NIM switch mechanism and associated logic is discussed in FIG. 3). The maintenance chip (MNT1) control logic responds only to the back-up NIM and ignores all commands from the primary NIM thereafter. The primary DBI interface and the secondary DBI interface are incorporated to insure that the back-up path would be functional if the primary interface failed. FIG. 2 is block diagram of the DBI interfaces and associated control logic within the maintenance chip (MNT1) chip.

DBI interface 110 receives as inputs, Same Power Group NIM Interface 122 and Other Power Group NIM interface 124. DBI interface 110 forces outputs DBI Interface Back Panel Cross Over 126 and DBI Interface Next Back Panel 128. DBI Selection and Register Address 112 receives as input DBI Address 120. DBI Selection and Register Address 112 is further coupled to DBI interface 110 via connections 130 and 132. DBI Selection and Register Address 112 determines if the particular maintenance function is intended for this particular XPC module by comparing DBI Address 120 to a predetermined XPC module address. If the addresses match then the maintenance function is intended for this XPC module. Register Control 116 is coupled to DBI interface 110 via wires 134 and 136. Register Control 116 is further coupled to DBI Selection and Register Address 112 via connection 138. The "SEL" input of Register Control 116 selects the active DBI interface. Register control 116 delivers both data and control bits to DBI Registers 118 via interfaces 142 and 144, respectively. DBI Registers 118 receives an address from DBI Selection and Register 112 via interface 140. DBI Registers 118 drives all maintenance functions to the XPC module via interfaces 146, 148, 150, 152 and 154.

Figure 3:
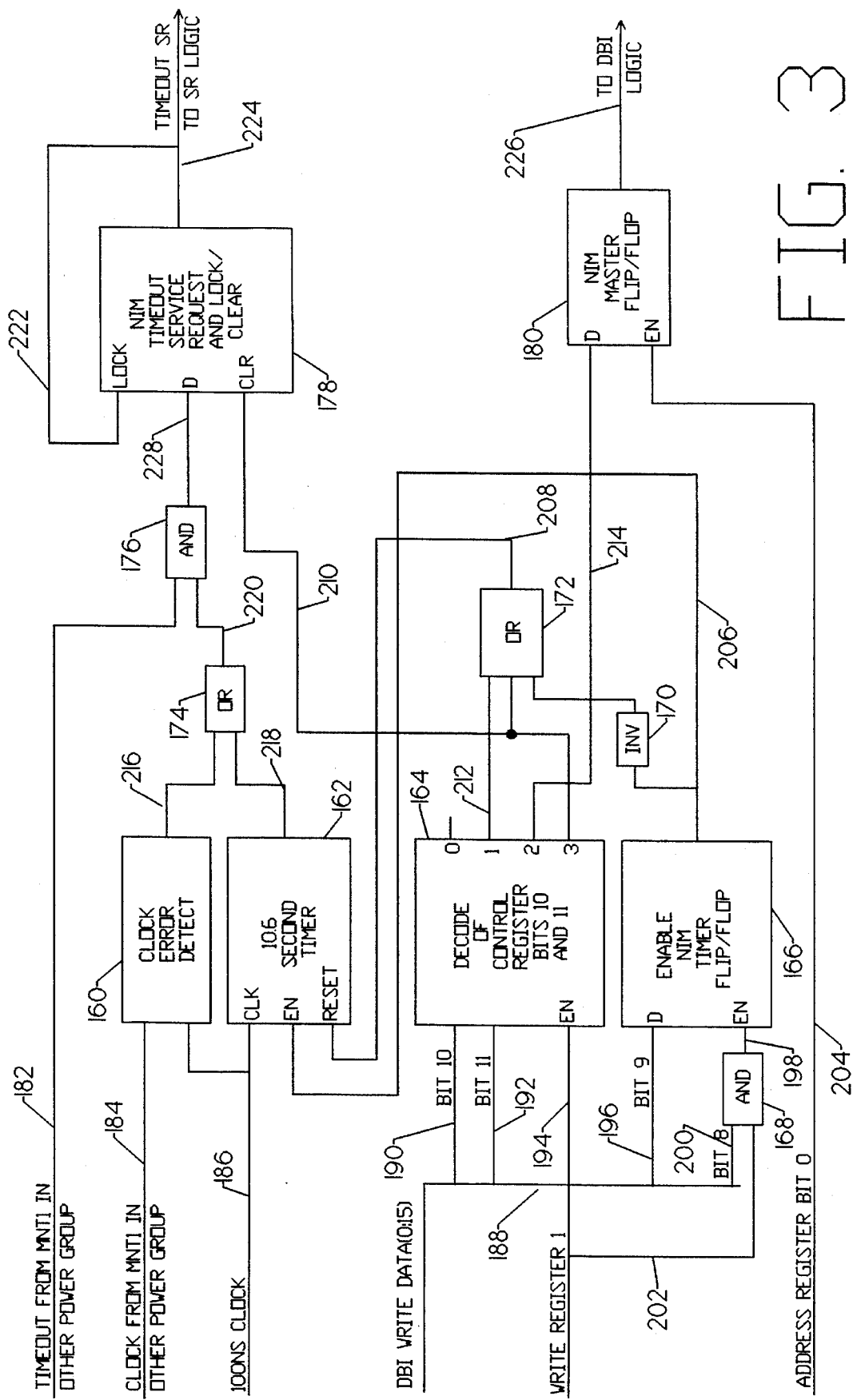
FIG. 3 is a block diagram of the preferred embodiment of the low level hardware NIM switch circuit.

FIG. 3 is block diagram of the preferred embodiment of the low level NIM switch circuit. Timer 162 is coupled to a 100 nanosecond clock signal via interface 186. In addition, Timer 162 has a reset pin which is coupled to three input or-gate 172 via interface 208. Three input or-gate 172 is coupled to the "1" and "3" output of decoder 164 via interface 212 and interface 210, respectively. Or-gate 172 provides a low level polling routine for determining if the primary NIM or maintenance path have failed. If or-gate 172 detects a failure then Timer 162 expires. Or-gate 172 is further coupled to inverter 170. Inverter 170 is coupled to the output of enable NIM timer flip-flop 166. The "enable" input pin of Timer 162 is also coupled to the output of the Enable NIM Timer flip-flop 166 via interface 206. Enable NIM Timer flip-flop 166 is used to disable NIM time-outs during system initiation or when the NIM is being fixed. Decoder 164 is coupled to bit ten of DBI Write Data 188 via interface 190. Decoder 164 is also coupled to bit eleven of DBI write Data 188 via interface 192. Finally, Decoder 164 is enabled by Write Register 1 via interface 194. The "data" input of Enable NIM Timer flip-flop 166 is coupled to bit nine of DBI Write Data 188 via interface 196. The "enable" input of Enable NIM Timer flip-flop 166 is coupled to and-gate 168 via interface 198. And-gate 168 is coupled to bit eight of DBI Write Data 188 via interface 200 and further coupled to Write Register 1 via interface 202.

Clock Error Detect 160 is coupled to a 100 nanosecond clock in the present power domain via interface 186 and further coupled to a clock from the other power group via interface 184. Therefore, this hardware detects a problem if the timer in the other power group is not functioning by comparing the clocks from both power domains. If the clocks do not compare, the timer from the MNT1 in the other power group may not be functioning and the NIM time-out interrupt will be activated. Or-gate 174 is coupled to the output of Clock Error Detect 160 via interface 216 and further coupled to the output of Timer 162 via interface 218. And-gate 176 is coupled to the time-out from MNT1 in the other power domain via interface 182 and further coupled to the output of or-gate 174 via interface 220. Therefore, if Timer 162 expires along with the timer from the MNT1 in the XPC module in the same back panel, the NIM wake-up interrupt will be activated. The data input of NIM Time-out Service Request Lock/Clear 178 is coupled to and-gate 176 via interface 228. In addition, the "clear" input of NIM Time-out Service Request and Lock/Clear 178 is coupled to the number "3" output of decoder 164 via interface 210. Finally, the output of NIM Time-out Service Request and Lock/Clear 178 is fed back to a lock input via interface 222. Therefore, if and-gate 176 presents a one to the data input of NIM Time-out Service Request and Lock/Clear 178, indicating that there is a fault, then the output of NIM Time-out Service Request and Lock/Clear 178 will also go to a one and will feed back to the "lock" input via interface 222 and will lock the output to that value. The only way to clear the locked value is by forcing bit ten and bit eleven of DBI Write Data 188 to a 1—1 state, thus causing decoder 164 to present a one on interface 210 and therefore to the "clear" input of NIM Time-out Service Request and Lock/Clear 178.

The data input of NIM Master flip-flop 180 is coupled to decoder 164 via interface 214. The "enable" input of NIM Master flip-flop 180 is coupled to Address Register bit 0 via interface 204. The output of NIM Master flip-flop 180 is coupled to DBI logic via interface 226. When the back-up NIM is awakened, it must execute a special sequence to take control of each MNT1 within the system. NIM Master flip-flop 180 must be written by setting Address Register bit 0 to a value of one. In addition, bit ten and bit eleven of DBI Write Data 188 must be set such that output "2" of Decoder 164 is set high. After this sequence, the XPC module will only accept commands from the backup NIM, ignoring anything from the failed primary NIM.

Note that the maintenance chip (MNT1) service request logic routes only the special NIM wake-up interrupt to the back-up NIM. All other interrupts are routed to the primary NIM until the NIM Master flip-flop 180 is set. When this occurs, all interrupts except the NIM time-out interrupt are routed to the back-up NIM.

There is also a PC console command for the NIM switch. This command is used when the PC console is active and attached to the system.

Having thus described the preferred embodiments of the present invention, those of skill in the art will readily appreciate that yet other embodiments may be made and used within the scope of the claims hereto attached.

What is claimed is:

1. An apparatus for detecting and correcting faults within a computer system comprising;
   a. a primary maintenance processor;
   b. a plurality of primary maintenance interfaces;
   c. a plurality of computer modules coupled to said primary maintenance processor via said plurality of primary maintenance interfaces;
   d. a secondary maintenance processor;
   e. a plurality of secondary maintenance interfaces coupling said plurality of computer modules to said secondary maintenance processor;
   f. a decoder coupled to said primary maintenance processor via said plurality of primary maintenance interfaces for decoding a predetermined set of control bits;
   g. an Or-Gate coupled to said decoder for polling the outputs of said decoder;
   h. a timer coupled to said Or-Gate for timing a predetermined time period wherein said timer expires after the predetermined time period if not reset by said Or-Gate during the predetermined time period; and
   i. a lock/clear circuit coupled to said timer for switching control from said primary maintenance processor and said plurality of primary maintenance interfaces to said secondary maintenance processor and said plurality of secondary interfaces when said timer expires.

2. An apparatus for detecting and correcting faults within a computer system comprising:
   a. a primary maintenance processor;
   b. a plurality of primary maintenance interfaces;
   c. a plurality of computer modules coupled to said primary maintenance processor via said plurality of primary maintenance interfaces;
   d. a secondary maintenance processor;
   e. a plurality of secondary maintenance interfaces coupling said plurality of computer modules to said secondary maintenance processor;
   f. decoding means coupled to said primary maintenance processor via said plurality of primary maintenance interfaces for decoding a predetermined set of control bits;
   g. polling means coupled to said decoding means for polling the outputs of said decoding means;
   h. timing means coupled to said polling means for timing a predetermined time period wherein said timing means expires after the predetermined time period if not reset by said polling means during the predetermined time period; and
   i. switching means coupled to said timing means and further coupled to said secondary maintenance processor for switching control from said primary maintenance processor and said plurality of primary maintenance interfaces to said secondary maintenance processor and said plurality of secondary maintenance interfaces when said timing means expires.

3. An apparatus for detecting and correcting faults within a computer system comprising:
   a. a primary maintenance processor;
   b. a plurality of primary maintenance interfaces;
   c. a plurality of computer modules having a first processing complex and a second processing complex;
   d. said first processing complex coupled to a first power domain and further coupled to said primary maintenance processor via said plurality of primary maintenance interfaces;
   e. a secondary maintenance processor;
   f. a plurality of secondary maintenance interfaces;
   g. said second processing complex coupled to a second power domain and further coupled to said secondary maintenance processor via said plurality of secondary maintenance interfaces;
   h. decoding means coupled to said primary maintenance processor via said plurality of primary maintenance interfaces for decoding a predetermined set of control bits;
   i. polling means coupled to said decoding means for polling the outputs of said decoding means;
   j. a timing means coupled to said polling means for timing a predetermined time period wherein said timing means expires after the predetermined time period if not reset by said polling means during the predetermined time period; and
   k. switching means coupled to said timing means for switching control from said primary maintenance processor and said plurality of primary maintenance interfaces to said secondary maintenance processor and said plurality of secondary interfaces when said timing means expires.

4. An apparatus for detecting and correcting faults within a computer system comprising:
   a. a primary maintenance processor;
   b. a plurality of primary maintenance interfaces;
   c. a plurality of computer modules each having a first processing complex and a plurality of second processing complexes;
   d. said first processing complex coupled to a first power domain and further coupled to said primary maintenance processor via said plurality of primary maintenance interfaces;
   e. a plurality of secondary maintenance processors;
   f. a plurality of secondary maintenance interfaces;
   g. each particular one of said plurality of second processing complexes coupled to a particular one of a plurality of second power domains and further coupled to a particular one of said plurality of secondary maintenance processors via said plurality of secondary maintenance interfaces;
   h. decoding means coupled to said primary maintenance processor via said plurality of primary maintenance interfaces for decoding a predetermined set of control bits;
   i. polling means coupled to said decoding means for polling the outputs of said decoding means;
   a timing means coupled to said polling means for timing a predetermined time period wherein said timing means expires after the predetermined time period if not reset by said polling means during the predetermined time period; and k. switching means coupled to said timing means for switching control from said primary maintenance processor and said plurality of primary maintenance interfaces to said one of said plurality of secondary maintenance processors and said plurality of secondary interfaces when said timing means expires.

5. An apparatus having a primary maintenance processor, a plurality of computer modules, and a plurality of primary interfaces coupling the primary maintenance processor to the plurality of computer modules, the improvement comprising:

a. the plurality of computer modules each having a first processing complex and a second processing complex;

b. said first processing complex coupled to said second processing complex via a clock maintenance interface;

c. said first processing complex further coupled to a first power domain, and further coupled to said primary maintenance processor via said plurality of primary maintenance interfaces;

d. a secondary maintenance processor;

e. a plurality of secondary maintenance interfaces;

f. said second processing complex coupled to a second power domain and further coupled to said secondary maintenance processor via said plurality of secondary maintenance interfaces;

g. a first timing clock coupled to said first power domain and a second timing clock coupled to said second power domain;

h. detecting means coupled to the primary maintenance processor for comparing said first timing clock and said second timing clock;

i. service request means coupled to said detecting means for indicating a fault if said first timing clock and said second timing clock do not compare; and j. switching means coupled to said service request means and further coupled to the primary maintenance processor and said secondary maintenance processor for switching control from the primary maintenance processor and the plurality of primary maintenance interfaces to said secondary maintenance processor and said plurality of secondary interfaces when said service request means indicates said fault.

6. An apparatus having a primary maintenance processor, a plurality of computer modules, and a plurality of primary interfaces coupling the primary maintenance processor to the plurality of computer modules, the improvement comprising:

a. the plurality of computer modules each having a first processing complex and a second processing complex;

b. said first processing complex coupled to said second processing complex via a clock maintenance interface;

c. said first processing complex further coupled to a first power domain, and further coupled to said primary maintenance processor via said plurality of primary maintenance interfaces;

d. a secondary maintenance processor;

e. a plurality of secondary maintenance interfaces;

f. said second processing complex coupled to a second power domain and further coupled to said secondary maintenance processor via said plurality of secondary maintenance interfaces;

g. a first timing clock coupled to said first power domain and a second timing clock coupled to said second power domain;

h. a detecting circuit coupled to the primary maintenance processor for comparing said first timing clock and said second timing clock;

i. a service request circuit coupled to said detecting circuit for indicating a fault if said first timing clock and said second timing clock do not compare; and j. a switching circuit coupled to said service request circuit and further coupled to the primary maintenance processor and said secondary maintenance processor for switching control from the primary maintenance processor and the plurality of primary maintenance interfaces to said secondary maintenance processor and said plurality of secondary interfaces when said service request circuit indicates said fault.

7. An apparatus having a primary maintenance processor, a plurality of computer modules, and a plurality of primary interfaces coupling the primary maintenance processor to the plurality of computer modules, the improvement comprising:

a. the plurality of computer modules each having a first processing complex and a second processing complex;

b. said first processing complex coupled to said second processing complex via a clock maintenance interface;

c. said first processing complex further coupled to a first power domain, and further coupled to said primary maintenance processor via said plurality of primary maintenance interfaces;

d. a plurality of secondary maintenance processors;

e. a plurality of secondary maintenance interfaces;

f. each particular one of said plurality of second processing complexes coupled to a particular one of a plurality of second power domains and further coupled to a particular one of said plurality of secondary maintenance processors via said plurality of secondary maintenance interfaces;

g. a first timing clock coupled to said first power domain;

h. each particular one of a plurality of second timing clocks coupled to said particular one of said plurality of second power domains;

i. detecting means coupled to the primary maintenance processor for comparing said first timing clock and said particular one of said plurality of second timing clocks;

j. service request means coupled to said detecting means for indicating a fault if said first timing clock and said particular one of said plurality of second timing clocks do not compare; and k. switching means coupled to said service request means and further coupled to the primary maintenance processor and said particular one of a plurality of secondary maintenance processors for switching control from the primary maintenance processor and the plurality of primary maintenance interfaces to said particular one of a plurality of secondary maintenance processors and said plurality of secondary interfaces when said service request means indicates said fault.

* * * * *